Jan. 28, 1941. S. H. BENJAMIN 2,230,102
SAFETY RAZOR
Filed July 27, 1940 8 Sheets-Sheet 1

INVENTOR
Sidney H. Benjamin
BY
his ATTORNEY

Jan. 28, 1941.  S. H. BENJAMIN  2,230,102
SAFETY RAZOR
Filed July 27, 1940  8 Sheets-Sheet 2

INVENTOR
Sidney H. Benjamin
BY
ATTORNEY

Jan. 28, 1941.   S. H. BENJAMIN   2,230,102
SAFETY RAZOR
Filed July 27, 1940   8 Sheets-Sheet 5

Jan. 28, 1941.　　　　S. H. BENJAMIN　　　　2,230,102
SAFETY RAZOR
Filed July 27, 1940　　　8 Sheets-Sheet 6

INVENTOR
Sidney H. Benjamin
BY
his ATTORNEY

Patented Jan. 28, 1941

2,230,102

UNITED STATES PATENT OFFICE 2,230,102

SAFETY RAZOR

Sidney H. Benjamin, Milwaukee, Wis.

Application July 27, 1940, Serial No. 347,838

16 Claims. (Cl. 30—40)

My invention relates to improvements in safety razors and refers particularly to safety razors of such construction as to prevent the removal or insertion of a blade without the assistance of special devices adapted for those purposes.

One of the objects of my invention is a safety razor of such construction that a blade can not be inserted therein without the assistance of a blade-carrying device adapted for that purpose.

Another object of my invention is a safety razor of such construction that a blade can not be removed therefrom without the assistance of a blade-carrying device adapted for that purpose.

Another object of my invention is a safety razor of such construction that the insertion of a blade-carrying device therein will insert and properly deposit a blade therein, and that the withdrawal of said blade-carrying device will withdraw a previously deposited blade therefrom.

Another object of my invention is a safety razor of such construction that a blade inserted therein will be firmly but removably attached to the guard member without abutment of the top, or cap, member.

Another object of my invention is a safety razor of such construction that a blade deposited and properly positioned on the guard member can not be conveniently removed therefrom without the assistance of a blade-carrying member adapted for that purpose.

Another object of my invention is a safety razor of such construction that a blade may be readily and properly inserted and deposited upon a guard member without contact with the fingers of the operator.

Another object of my invention is a safety razor of such construction that a blade deposited upon a guard member can be removed without contact with the fingers of the operator.

It is evident that the safety razors of my invention possessing the above-mentioned attributes, and many others which will be evident upon a consideration of my disclosures and descriptions herein, have many important and valuable properties over those in which it is necessary for the operator to handle the blades, frequently resulting in cutting the fingers; and, in which the blade frequently becomes displaced due to the tilting, or canting, of the device during the blade-positioning operation.

In the accompanying drawings illustrating modifications of the devices of my invention, similar parts are designated by similar numerals.

Figures 1, 2, 3, 4, 5:
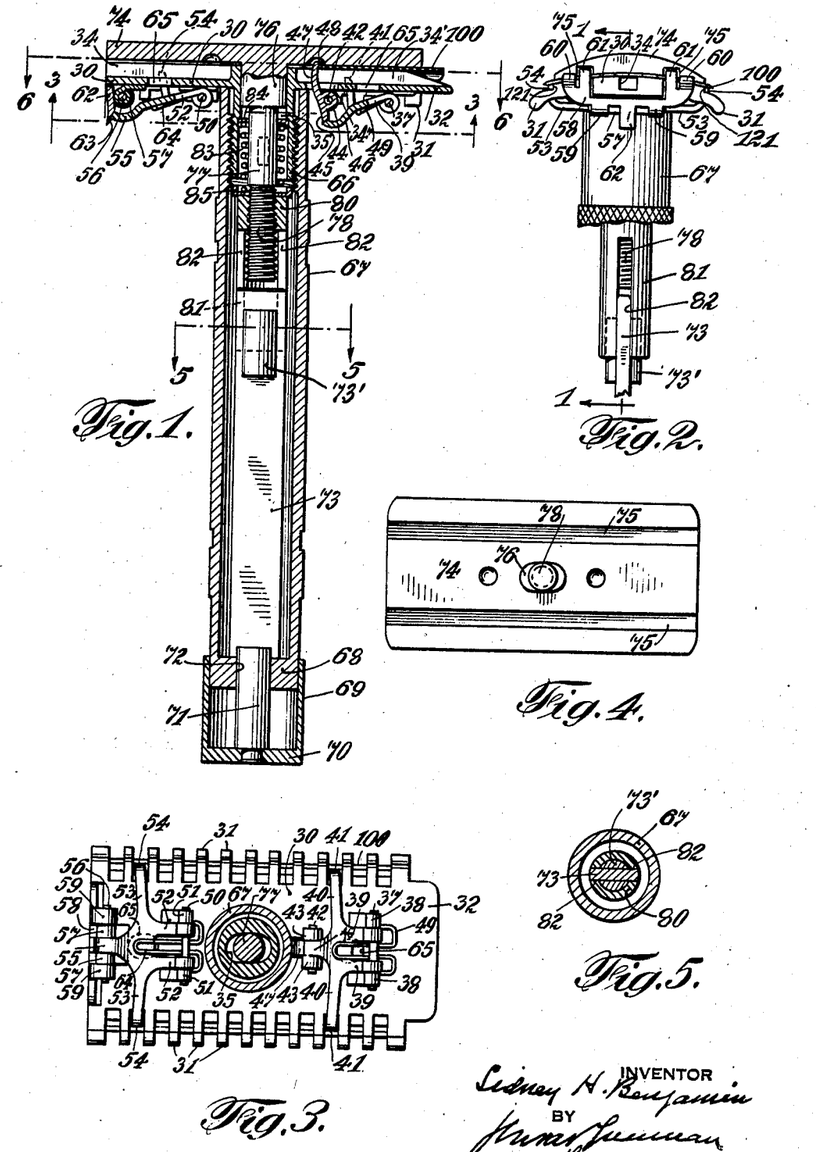
Figure 1 is a central vertical section taken on the line 1—1 of the razor of Figure 2.
Figure 2 is a left-end view of the device of Figure 1.
Figure 3 is a section through the line 3—3 of Figure 1.
Figure 4 is a bottom view of the cap or cover of the devices of Figures 1 to 3.
Figure 5 is a section through the line 5—5 of Figure 1.
Figure 6:
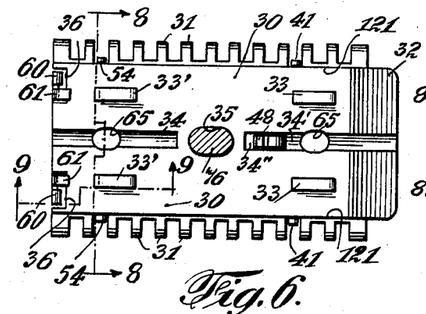
Figure 6 is a section through the line 6—6 of Figure 1.

The particular form of a device of my invention as shown in Figures 1 to 11 comprises a guard member 30, having a plurality of extended teeth 31, 31 upon each side thereof, the end portion 32 of the guard 30 being inclined downwardly as shown particularly in Figure 1, for purposes to be described later. The upper face of the guard 30 carries a plurality of spaced extended lugs 33, 33, 33', 33', the lugs 33', 33', being under-cut to retain the blade in a locked position, two longitudinal recesses, or slots, 34, 34' and a centrally positioned elongated opening 35. One end of the guard 30 has two recesses 36, 36, all of which are shown particularly in Figure 6.

Figure 9:
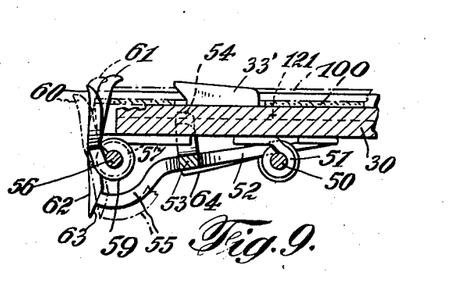
Figure 9 is an enlarged section through the line 9 of Figure 6.

A blade-retaining mechanism is attached to the under face of the guard 30 at the inclined end portion thereof, as shown particularly in Figures 1, 3 and 9, and comprises a bar 37 carried by the bearings 38, 38 which are attached to the under face of the guard 30. The blade-retaining element comprises the arms 39, 39, the ends of which are turned over the bar, or rod, 37, thus causing the latter to act as a pintle around which the blade-retaining element can revolve. The two trip arms 40, 40 of the blade-retaining mechanism extend outwardly from each other and terminate in angularly extended members 41, 41, extending upwardly between the teeth 31, 31 of the guard 30, the ends of the upwardly extended members 41, 41 being slightly above the upper face of teeth 31, 31.

The arm 46 extends downwardly and inwardly toward the central portion of the guard 30, the end portion being adapted to abut upon a blade-contacting member, to be later described. A further element of the blade-retaining mechanism comprises a rod 42 carried by the bearings 43, 43 fixedly attached to the under face of the guard 30. The blade-contacting element of the blade-retaining mechanism comprises the element 44 revoluble about the rod 42, having a downwardly extended arm 45, the extremity of which abuts upon the extremity of the arm 46; the arm 47 extends upwardly through a hole 34" of the recess 34' of the guard 30 and terminates in an outwardly extended hook-like blade-retaining member 48. A spring 49 retains the arm 46 in the position shown in Figure 1.

It is evident from the above that the member 47 and its hook-like blade-retaining end 48 can not be moved downwardly or in a rotary direction by pressure upon the blade-retaining member, but that by a downward pressure upon the ends 41, 41 of the trip 40, 40, the arm 46 will be depressed and thus removed from abutment upon the arm 45, thus allowing the arm 47 and its blade-retaining member 48 to be revolved around the rod 42 and enabling the blade-retaining member 48 to be lowered below the upper face of the guard 30 by its downward passage through the hole 34" of the slot 34'.

A second blade-retaining mechanism carried by the guard 30 and shown particularly in Figures 1, 3, 9 and 10 comprises a rod 50 supported by the two bearings 51, 51 attached to the lower face of the guard 30. The blade-retaining element comprises the arms 52, 52, the ends of which encircle the rod 50, which latter acts as a pintle around which this element of the mechanism can revolve. The arms 53, 53 extend away from each other, the extremities or trips 54, 54 being bent upwardly and extending between teeth 31, 31 of the guard 30 to a distance slightly above the upper face of the teeth 31, 31. The arm 55 extends downwardly and outwardly as particularly shown in Figure 9. A rod 56 is carried by the bearing 57 fixedly attached to the lower face of the guard. The arm 58 has two extended members 59, 59 encircling the rod 56 which thus acts as a pintle around which the arm 58 can revolve. The arm 58 has two upwardly extended members 60, 60 to limit the inward movement of an inserted blade and two upwardly extended hook-like blade-retaining members 61, 61 extending inwardly beyond the two arms 60, 60 to contact and hold a blade in position. The arm 58 has also a downwardly extended element 62, the bevelled end 63 of which abuts upon the end of the member 55. A spring 64 acts to maintain the mechanism in the position shown particularly in Figure 9. It is evident, therefore, that in this normal position, the hook-like member can not be moved revolubly around the rod 56, but that a downward pressure upon the trips 54, 54 will break the abutment between the arms 55 and 63 and allow of a movement of the blade-retaining members 61, 61.

The guard 30 has two openings 65, 65 to allow of the passage of water during the washing operation after the device has been used in a shaving operation.

The under face of the guard 30 carries a fixedly attached exteriorly threaded tubular member or stud 66 adapted to receive a handle for the device.

The illustrated handle comprises a cylindrical member 67, the upper portion of which is internally threaded to mesh with the exteriorly threaded guard member 66, the lower end of the cylindrical member 67 being closed by the closure member 68. The lower portion of the cylindrical member 67 carries a revoluble sleeve 69, the closed end 70 of the sleeve 69 carrying the fixedly attached cylindrical member 71 which extends through the opening 72 of the end member 68 of the cylindrical member 67 and carries a fixedly attached elongated flat member 73, which is guided at its upper portion by a cylindrical member 73' within the sleeve 80.

My device includes a cap adapted to be capable of pressure abutment upon the upper face of a blade and to maintain it in fixed position between the guard and the cap for shaving purposes.

The cap illustrated in the drawings under consideration comprises a top member 74 having the two parallel longitudinal recesses 75, 75, which are so positioned as to receive the lugs 33, 33 of the guard 30. Fixedly attached to the under face of the top member 74 is a centrally positioned downwardly extended member, the upper portion 76 of which is longitudinally shaped, its dimensions being such that it can be passed through the opening 35 of the guard 30 when the longitudinal axes of the members 76 and 35 are parallel, and which portion 76 is not capable of being passed through said opening when said longitudinal axes are not parallel to each other. The longitudinally shaped member 76 is extended into an elongated annular member 77 adapted to pass through the opening 35 of the guard 30 and into the cylindrical stud 66, the lower portion 78 of said member 77 being threaded. Co-acting with the threaded member 78 is the interiorly threaded revoluble cylindrical member 80, the lower end portion 81 of which has the opposed longitudinal slits, or recesses, 82, 82 into which the longitudinal flat members 73, 73 are inserted. A coil spring 83 abutting upon the member 84 and the loose washer 85 which abuts upon the upper face of the cylindrical member 80, tends to push the top member 74 upon a blade placed upon the guard.

The revolution of the sleeve 69, revolves the member 73 which in turn revolves the sleeve 80. If the revolution of the sleeve 69 is clock-wise, this revolution moves the sleeve 80 upwardly until the washer 85 abuts upon the lower face of the stud 66, a further movement drawing the cap 74 firmly upon a blade situated upon the guard 30 and maintaining it in position during a shaving operation.

If it is desired to insert a new blade or remove an old blade, or both, the sleeve 69 is revolved anti-clockwise, whereupon the sleeve 80 moves downwardly, the washer 85 is separated from the lower face of the stud 66, and the spring 83 will tend to raise the top 74 from contact with the blade, and if this movement is continued until the flat portion 76 of the vertically movable member is above the opening 35 of the guard, the top 74 can be revolved, and if revolved a quarter turn the spring 83 and member 76 will retain it in this open portion, which position is adapted for the ready washing of the device, which washing process is facilitated by water passing through the openings 65, 65 in the guard.

Figure 7:
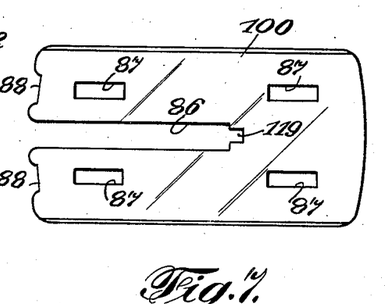
Figure 7 is a top view of one form of a blade adapted for use in my razor.
Figure 8:
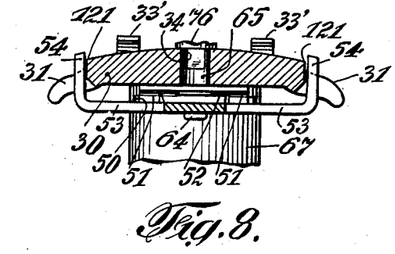
Figure 8 is an enlarged section through the line 8—8 of Figure 6, with the cap, or top, removed.

The form of blade adaptable for the described razor of my invention is shown in Figure 7 and comprises a blade of ordinary, or desired, thickness and dimensions having a longitudinal centrally positioned recess 86, four longitudinal openings 87, 87, and end recesses 88, 88 for purposes to be described later.

One of the objects of my invention is a razor so constructed that it is impossible to insert or remove a free individual blade without the assistance of specially constructed devices particularly adapted for that purpose.

That a blade can not be introduced into or removed from the described device of my invention without the employment of specially designed devices is evident from a consideration of the following description.

Assuming that the device is in the normal condition for shaving as shown particularly in Figures 1, 2, 6 and 7, the blade 100 is attached to the upper face of the guard 30, as follows: One end of the blade abuts upon the fixed abutments 60, 60 thus preventing its longitudinal movement in one direction, the hook-like blade-connecting members 61, 61 overlap the blade and prevent its vertical movement at this end, the projecting lugs 33, 33 of the guard extend into the openings 87, 87 of the blade preventing longitudinal movement of the blade, and the hook-like blade-retaining member 48 extending over the blade prevents its vertical movement, and the hook-like blade-retaining members 61, 61 and the hook-like blade-retaining member 48 can not be released from their abutment upon the blade to allow of vertical movement of the blade, without special devices adapted to depress the trips 54, 54 and 41, 41 while at the same time allowing freedom of vertical movement of the blade, which would be prevented in this position as the cap is in firm abutment upon the upper face of the blade, and hence the blade could not be removed even if the trips 54, 54 and 41, 41 were depressed.

It is to be noted that even the raising of the cap by revolution of the sleeve 69 will not release the blade, as the blade is firmly attached to the guard by the described mechanism carried by the guard.

Figure 10:
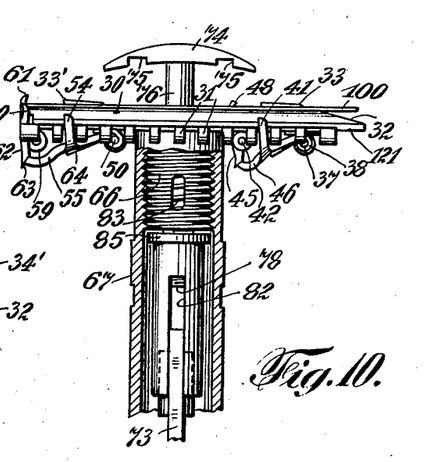
Figure 10 is a side view of the razor of Figure 1, partly in section and with the cap or top raised and revolved 90°.
Figure 11:
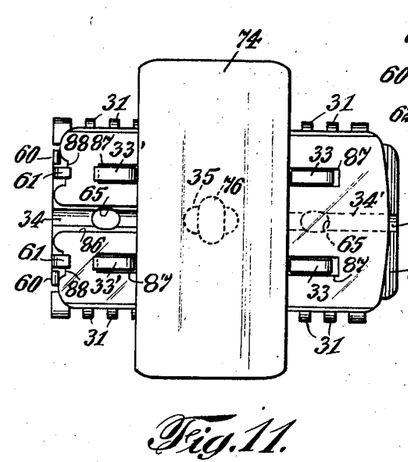
Figure 11 is a top view of Figure 10.

That a blade can not be introduced into the described device of my invention without special mechanism adapted for that purpose is evident from the following:

As a blade can not be introduced unless the cap is raised from abutment upon the guard, it is necessary to raise the cap from the guard and maintain it in that position during the insertion of a blade. Assuming, therefore, that the cap is raised from the guard and retained in that position during the attempt to introduce a blade. In order that a blade may be placed in abutment upon the upper face of the guard, the one edge of the blade must be beneath the hook-like members 61, 61, beneath the hook-like member 48, and the projecting lugs 33, 33 of the guard must be inserted in the openings 87, 87 of the blade. A consideration of the drawings shows that such positioning is not possible. If a blade be moved inwardly in order that the member 76 of the cap can pass through the opening 86 of the blade, the interior edge of that slot will contact the blade-retaining member 48 of the guard, preventing the further insertion of the blade and there is not space enough between the hook-like blade-retaining member 48 and its adjacent lugs 33 of the guard to flex the blade beneath the member 48. Further, the edge of the blade must be positioned beneath the hook-like members 61, 61 and the blade can not reach them, and even if it did pass the cap member 76, there is not space enough between the members 61, 61 and their adjacent guard lugs 33 to flex the blade to accomplish the purpose. As it is evident that the guard lugs 33, 33 must be inserted within the blade openings 87, 87 in order to position the blade, this can not be accomplished for the reasons stated above. In addition to the above-mentioned means for preventing the insertion of a blade without the employment of a special device, if the cap is positioned as shown in Figures 10 and 11, the width of the member 76 will prevent the insertion of a blade as it is wider than that of the blade slot 86. It is evident, therefore, that the employment of some device which will depress the members 41, 41 and 54, 54 is necessary in order to insert a blade.

In order to demonstrate that my device is operative, I illustrate and describe one form of a device adapted for this purpose.

Figures 12 to 18 illustrate modified forms of a device of my invention adapted for the insertion, and removal of blades into and from the razor of my invention previously described.

The particular form of my operating device shown in Figures 12, 13, 14 and 15 comprises a blade magazine adapted to receive a stacked plurality of blades. The top, sides and a portion of the bottom are formed by a flat top member 101, the sides of which are bent upwardly and then outwardly to form the curved edges 102, 102, then downwardly to form the sides 103, 103, then inwardly to form the bottom members 104, 104, then upwardly to form the shoulders 105, 105 and then inwardly to form the inclined blade guides 106, 106. The top 101 has a recess consisting of the rectangular recess 107 extended into the longitudinal recess 108, the portion 109 of the top 101, containing the rectangular recess 107 being inclined downwardly, the outer edge of which is spaced from the inclined member 106 to allow of the passage of a blade therethrough. The lugs 110, 110 which are rectangular in shape are secured to the top 101 of the operating device. Positioned within the device is a leaf spring 111 having the longitudinal recess 112 and the openings 113, 113 through the latter of which extend the lugs 110, 110. The spring 111 is riveted to the top 101 by means of the rivet 114, and in normal position the two end extremities 115, 115 are resiliently pressed against the under face of the inclined member 106. A plurality of blades 100, 100 as shown in Figure 7, are stacked within the blade magazine, as shown, the recess 86 of the blades coinciding with the recess 108 of the top member 101 and the recess 112 of the spring 111, with the lugs 110, 110 of the device passing through the holes 87, 87 of the blade. The blades are thus positioned in exact coincidence with each other within the magazine. The space between the faces of the lugs 110, 110 and the inner edge of the member 106 is less than the thickness of two blades, thus allowing of the passage of only one blade from the magazine, and the spring 111 forces the bottom blade of the stack in the magazine against the under edge of the member 106 in position for withdrawal therefrom through the space between the members 106 and 109. The rear end of the magazine is closed by the member 116.

Figures 12, 16:
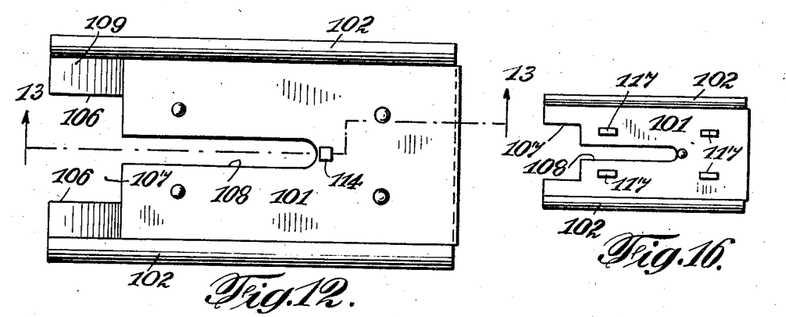
Figure 12 is a top view of a blade magazine ejector adapted for use with my razor shown in the previous figures.
Figure 16 is a top view of a modified form of a blade magazine ejector of my invention.
Figure 13:
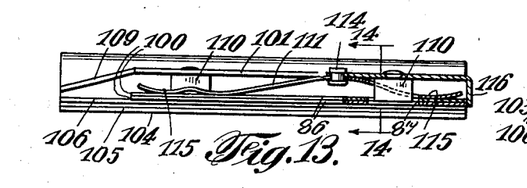
Figure 13 is a section through the line 13 of Figure 12.
Figure 14:
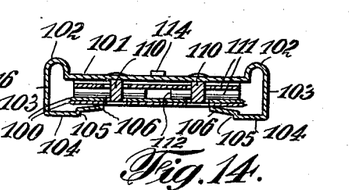
Figure 14 is a section through the line 14—14 of Figure 13.
Figure 15:
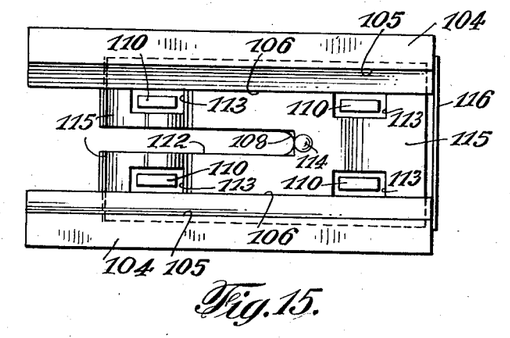
Figure 15 is a bottom view of Figure 12 with the blades removed.

The modified form of my blade magazine shown in Figure 16 is similar to that shown in Figures 12, 13, 14 and 15 except that the lug 114 of the top 101 has been substituted by the four rectangular lugs 117, 117.

Figure 17:
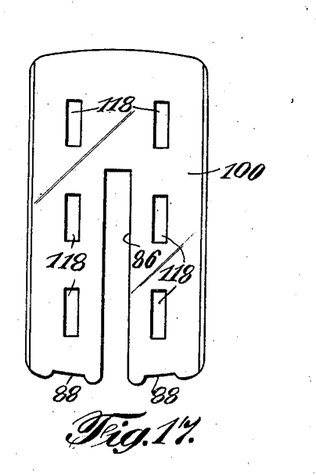
Figure 17 is a top view of a modified form of a blade adapted for use in a razor of my invention.

The modified form of my blade shown in Figure 17 is similar to that shown in Figure 7 except that it has six openings 118, 118 and the reduced portion 119 of the recess 86 has been eliminated.

Figure 18:
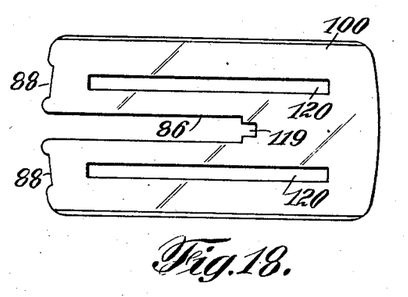
Figure 18 is a top view of a modified form of a blade of my invention.
Figure 19:
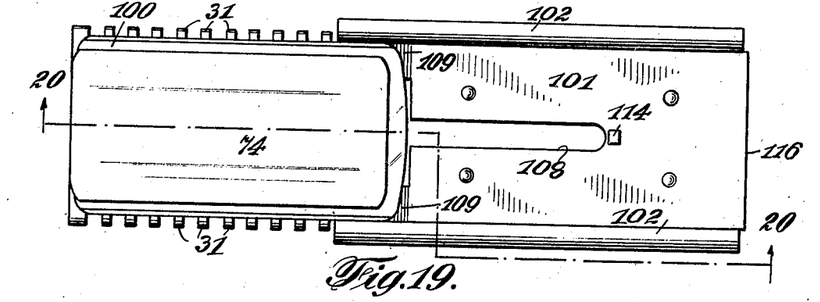
Figure 19 is a top view of the blade magazine ejector of Figure 12 partially introduced into the razor of Figure 1 for the purpose of removing a used blade and the insertion of a new one.

The modified form of my blade shown in Figure 18 is similar to that shown in Figure 7 except that it has two elongated openings 120, 120 instead of the four openings 87, 87.

The method of applying the blade magazine shown in Figures 12, 13, 14 and 15 to the insertion and deposit of a new blade and the withdrawal of an old blade to the razor shown in Figures 1 to 11, the application of the modified forms being similar, is shown in Figures 19 to 23.

Figures 1 and 2 illustrate the first step of thus inserting a blade and withdrawing a blade and comprises raising the cap 74 from abutment upon the positioned blade 100 which it is desirous of removing from the razor. The inclined portion 109 of the magazine top 101 is inserted between the inclined member 32 of the guard 30 and the blade 100, the blade 100 thus resting upon the upper face of the inclined portion 109 of the magazine top 101 and the magazine is forced slowly inwardly. During this movement the shoulders 105, 105 of the magazine abut upon the shoulders 121, 121 of the guard 30, thus guiding the magazine longitudinally over the guard.

Figure 20:
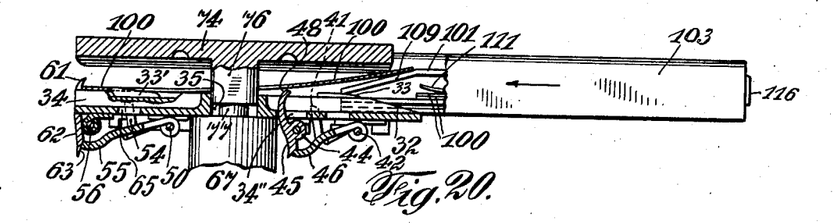
Figure 20 is a section through the line 20—20 of Figure 19.

This position is shown in Figure 20, from which it will be noted that the blade 100 is flexed and the end portion is upon the inclined member 109 of the magazine, this flexing removing the blade from the blade-retaining member 48, that member, however, not being allowed to swing freely as the trip 44 has not been moved, and it will also be noted that the trip 54 has not been moved to release the blade from the blade-retaining members 61, 61.

Figures 21, 22, 23:
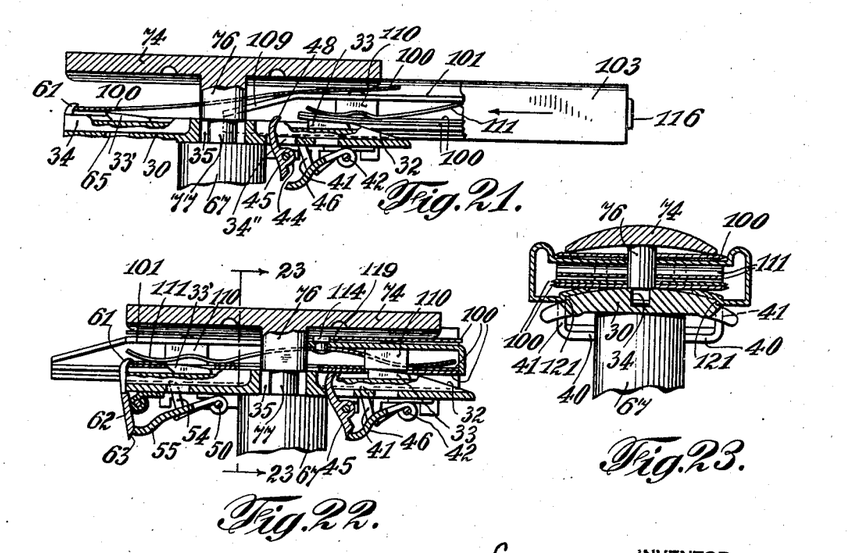
Figure 21 is a vertical cross-section of the ejector and the razor head, with the ejector further advanced into the razor over that shown in Figure 20.
Figure 22 is a vertical cross-section with the ejector fully advanced into the razor head.
Figure 23 is a section through the line 23—23 of Figure 22.
Figures 24, 25, 26:
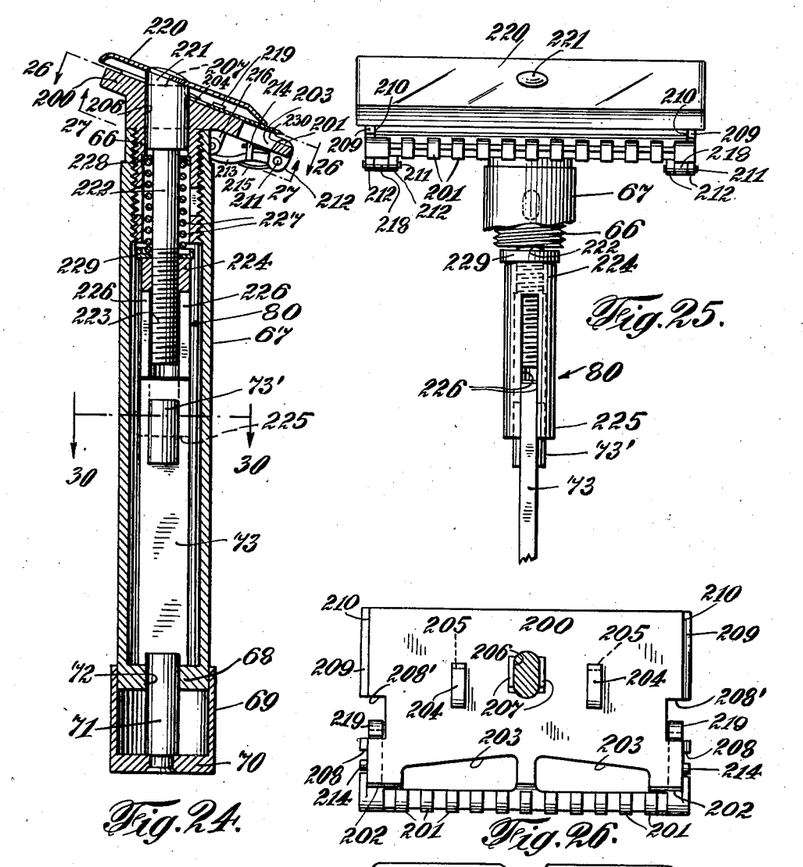
Figure 24 is a longitudinal section of a modified form of a device of my invention.
Figure 25 is a front view of a portion of the device of Figure 24, partly in section.
Figure 26 is a section through the line 26—26 of Figure 24.
Figure 27:
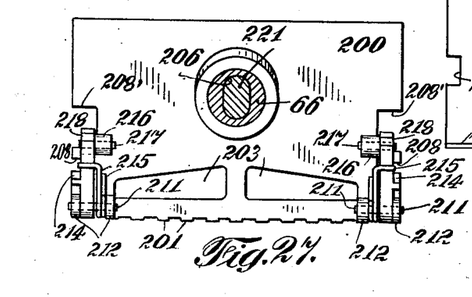
Figure 27 is a section through the line 27—27 of Figure 24.

Figure 21 illustrates a further inward movement of the magazine, in which the blade 100 has moved up further along the upper face of the inclined portion 109 of the magazine, but is still retained by the blade retaining members 61, 61. The trip 44 has now been depressed by the bottom 104 of the magazine as it has passed over it, thus releasing the blade-retaining member 48 and allowing it to be moved out of the way for the passage of the magazine blades.

Figure 22 shows the complete passage of the magazine into the razor. The blade 100 is now positioned upon the upper face of the top 101, and the square lug 114 engages the recess 119 of blade 100, and the withdrawal of the operating device carries the blade with it. The trip 54 has now been depressed by the magazine causing the blade-retaining member to move outwardly so that it will not interfere with the insertion of a new blade. During this movement the magazine has carried the stack of blades inwardly and has positioned them properly above the guard. The lower blade of this stack has been pressed downwardly by the spring 111 allowing it to pass over the magazine lugs 110, 110 and hence outwardly of the magazine, while the remaining blades are prevented from such movement. The lugs 33, 33 of the guard now enter the openings 87, 87 of the lower blade, thus retaining the blade positioned upon the guard during the withdrawal of the magazine. During this withdrawal, the released trips 44 and 54 move upwardly thus locking the blade-retaining members 61, 61 and 48 in their blade retaining position, and at the same time the magazine withdraws the old blade which is retained upon its top during this withdrawal movement. The cap 74 is then positioned in abutment upon the blade by revolving the handle sleeve 69.

It is to be noted that in my device a blade is placed in removable attached position upon a guard without the employment of a cap to accomplish this result.

The modified form of a device of my invention illustrated in Figures 24 to 32 is directed to razors adapted to be used with single edge blades.

The handle of this form of my device is similar to the handle shown in Figures 1 to 10, and comprises a cylindrical member 67, the upper portion of which is internally threaded to mesh with the externally threaded guard member 66, the lower end of the cylindrical member 67 being closed by the closure member 68. The lower portion of the cylindrical member 67 carries a revoluble sleeve 69, the closed end 70 of the sleeve 69 carrying the fixedly attached cylindrical member 71 which extends through the opening 72 of the end member 68 of the cylindrical member 67 and carries a fixedly attached elongated flat member 73, which is guided at its upper portion by a cylindrical member 73' within the sleeve 80.

The guard 200 of the modified form of a device of my invention carries a plurality of extended teeth 201, 201 upon one side thereof, a longitudinal portion 202 of the guard behind the teeth being depressed from the face of the guard for purposes to be described later. The guard 200 has a plurality of openings 203, 203 adapted to facilitate washing of the blade and to prevent soap-suds from blocking the passage between the guard and a blade during a shaving operation. The guard carries also two extended rectangular lugs 204, 204 which are under cut 205, 205 at their inner sides. It has also an elongated opening 206 and an extended platform 207 having an opening therein corresponding to the opening 206.

The guard has the two opposed cut-outs, or recesses, 208, 208 and two other recesses 208', 208', and the end portions 209, 209 are depressed to form guide shoulders 210, 210 for purposes to be described later.

A blade-retaining mechanism is attached to each side of the under face of the guard 200 in proximity of the plurality of teeth and comprises a bar 211 carried by the bearings 212, 212, carried by the bar 211 and revolubly thereon is a member 213 having the upwardly extended trip 214, a spring 215 maintaining the trip 214 above the upper face of the guard when in normal position. The bearings 216, 216 carried by the under face of the guard support a rod 217, which carries a revoluble blade retaining member, or dog, 218, the upper portion of which forms a hook-like projection 219.

Figure 29:
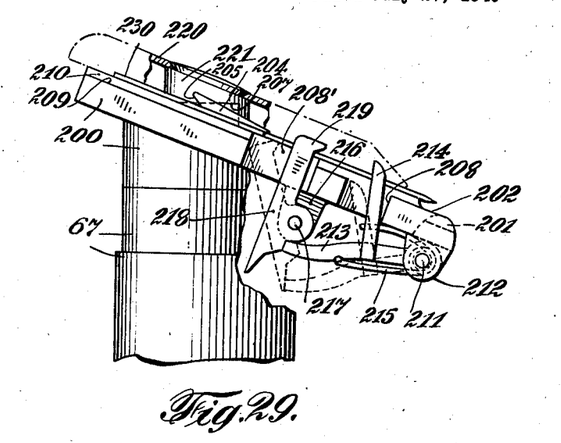
Figure 29 is an enlarged left end view of the upper portion of Figure 24.
Figure 30:
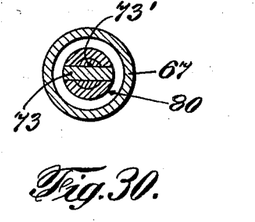
Figure 30 is a section through the line 30—30 of Figure 24.
Figure 31:
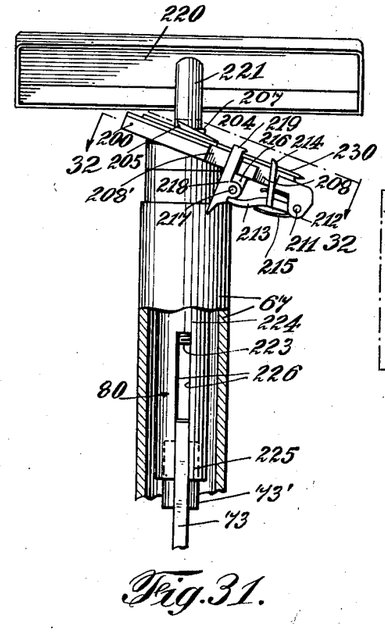
Figure 31 is an enlarged end elevation, partly broken away, of the upper portion of Figure 24 with the cap raised and revolved 90°.

As illustrated particularly in Figure 29, in full lines, when the device is in normal position the trip 214 and the dog 219 are both above the upper face of the guard 200. If, however, the trip is forced inwardly from the toothed edge of the guard, it will move downwardly through the recessed opening 208 and will be positioned in the plane of the upper face of the guard. This movement will release the abutment of the end of member 213 against the lower portion of the dog 218 and will allow it to move inwardly and downwardly from its position above the face of the guard within recesses 208', 208' and the blade-retaining members will then be in the broken line position shown in Figure 29.

Upon the removal of the downward pressure upon the trip 214, the spring 215 will return the described elements into their former positions, with the trip 214 and the dog 219 above the plane of the upper face of the guard.

Figure 32:
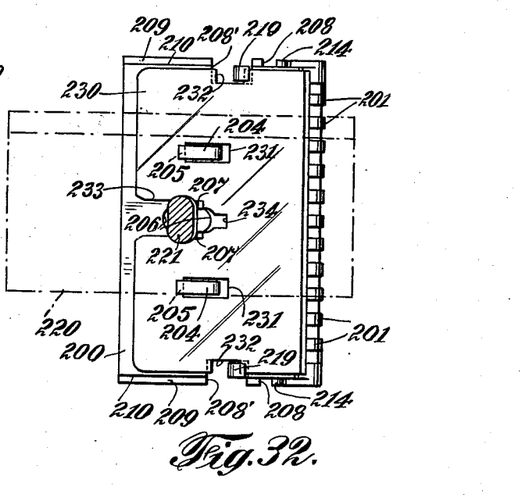
Figure 32 is a section through the line 32—32 of Figure 31.
Figure 33:
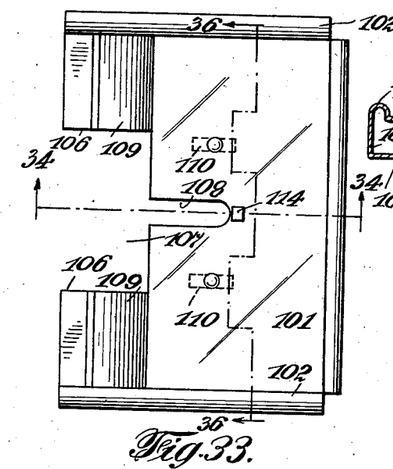
Figure 33 is a top view of a magazine adapted for use with the device of Figure 24.
Figure 34:
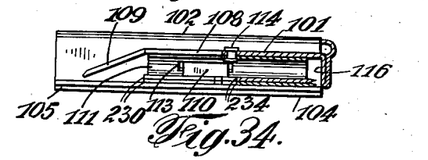
Figure 34 is a section through the line 34—34 of Figure 33.
Figure 35:
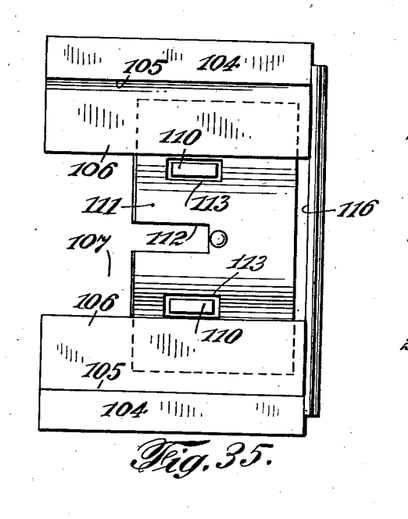
Figure 35 is a bottom view of Figure 33 with the blades removed.
Figure 36:
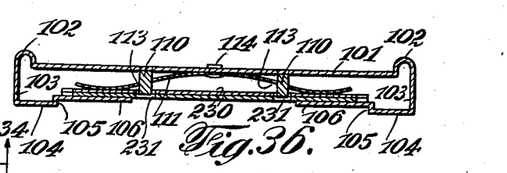
Figure 36 is a section through the line 36—36 of Figure 33.
Figure 37:
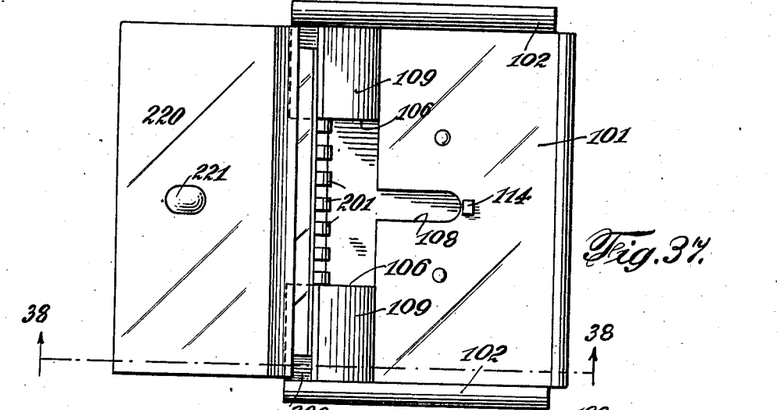
Figure 37 is a top view of a blade magazine ejector adapted for use with the razor of Figure 24 partially introduced therein for the purpose of removing an old blade and inserting a new one.
Figure 38:
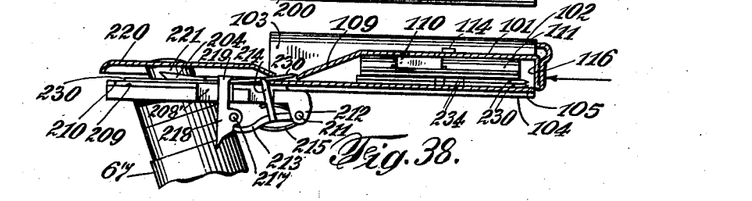
Figure 38 is a section through the line 38—38 of Figure 37.
Figure 39:
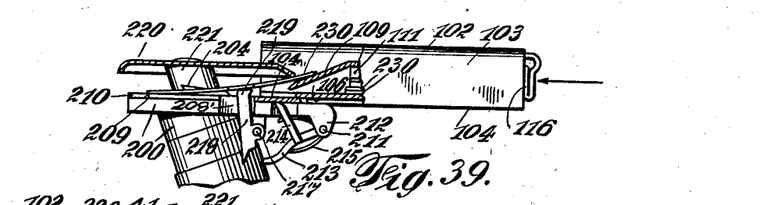
Figure 39 is a vertical section of the ejector and razor head with the ejector advanced further than shown in Figure 38.
Figure 40:
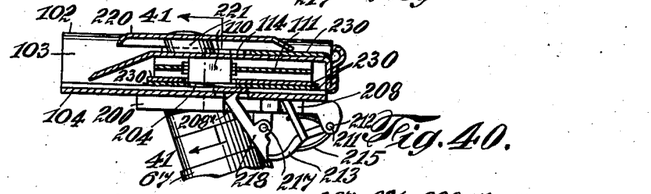
Figure 40 is a vertical section of the ejector and razor head with the ejector fully advanced.
Figure 41:
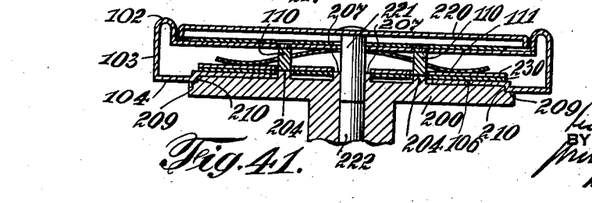
Figure 41 is a section through the line 41—41 of Figure 40.

The top member of the illustrated device comprises the top 220 to which is fixedly attached a centrally positioned downwardly extended member, the upper portion 221 of which is longitudinally shaped, its dimensions being such that it can be passed through the opening 206 of the guard and the corresponding opening in the platform 207 when the longitudinal axis of the member 221 and of said openings are paralleled, and which portion 221 is not capable of being passed through said openings when said longitudinal axes are not paralleled to each other (see Figure 32). The longitudinally shaped member 221 is extended into an elongated cylindrical member 222 adapted to pass through the opening 206 of the guard and the corresponding opening of the platform 207, and with the cylindrical member 222, the lower portion 223 of said member 222 being threaded. Co-acting with the threaded member 223 is the internally threaded revoluble cylindrical member 224, the lower portion 225 of which has opposed longitudinal slits, or recesses, 226 with which the longitudinal flat member 73 is inserted.

A coil spring 227 abutting upon the member 228 and the loose washer 229 which abuts upon the upper face of the cylindrical member 224 tends to push the top member 220 upon a blade placed upon the guard 200.

The revolution of the sleeve 69 revolves the member 73, which in turn revolves the sleeve 80. If the revolution of the sleeve 69 is clock-wise, this revolution moves the sleeve 80 upwardly until the washer 229 abuts upon the lower face of the member 66, a further movement drawing the cap 220 firmly upon a blade situated upon the guard 200 and maintaining it in position during a shaving operation.

If it is desired to insert a new blade, or remove a used blade, or both, the sleeve 69 is revolved anti-clockwise whereupon the sleeve 80 moves downwardly, the washer 229 is separated from the lower face of the member 66 by the spring 227, and the cap 220 is free to be raised from contact with the blade. When in this position, the sleeve 69 can be moved upwardly, the flat portion 221 of the cap stem will be moved into a position above the upper face of a blade situated upon the guard and can then be revolved into the position shown in Figures 31 and 32 and upon a release upon the upper movement of the sleeve 69, the spring 227 will cause the lower face of the member 221 to abut upon the platform 207 retaining the cap in its raised position.

Figure 28:
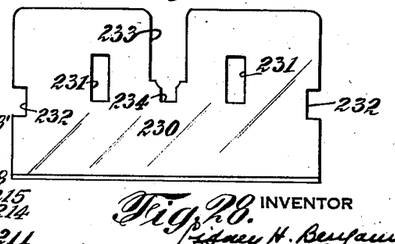
Figure 28 is a plan view of a razor blade adapted for use with the device of Figure 24.

A form of blade 230 adaptable for the described razor of my invention is shown in Figure 28, and comprises a blade or ordinary or desired thickness dimensions having two openings 231, 231, opposed end recesses 232, 232 and a rear recess 233 extended into the reduced recess 234.

To introduce a blade into the razor, the sleeve 69 is revolved counter-clockwise allowing a free upper movement of the cap 220. The two trips 214, 214 are simultaneously depressed, thus releasing the blade-retaining dogs 219, 219 from abutment with the said trips and allowing them to swing backwardly and downwardly. A blade is now positioned upon the guard, the openings 231, 231 being positioned over the lugs 204, 204 of the guard with the edges of the openings 231, 231 resting in the undercuts 205, 205 of the lugs 204, 204, thus preventing the forward movement of the blades. The pressure is now released from the trips 214, 214, the spring acting to force the dogs 219, 219 upwardly and forwardly until the hook-like portions of the dogs are positioned upon the upper faces of the blade, thus preventing a rearward movement of the blade.

It will thus be noted that the blade is removably attached to the guard and that it can not be released therefrom until there is a simultaneous depression of the two trips 219, 219.

It will be further noted that if the cap is retained in its upper position a blade can not be introduced as the longitudinal length of the member 221 is greater than the width of the blade recess 233 and hence during the process of inserting a blade the cap 220 must be free to be moved upwardly although under the downward pull of the spring 227. Further, during the insertion of a blade, the cap must be thus raised against the spring pull, the blade must be inserted accurately in order that it may be properly positioned upon the guard lugs and the two trips must be simultaneously depressed and held in that position during the blade insertion.

It is evident, therefore, that it is practically impossible to perform all of these operations without the assistance of a device especially adapted to perform all of the operations accurately and automatically and hence the device of my invention is a razor in which the insertion and withdrawal of a blade is impossible without such a device.

Figure 42:
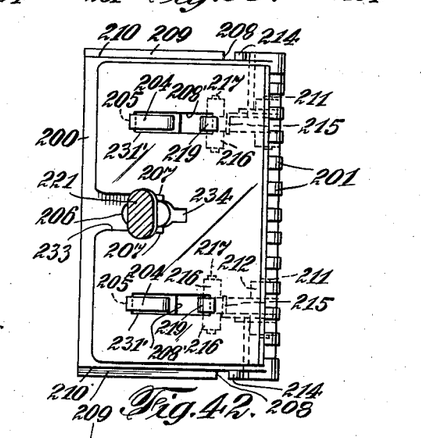
Figure 42 is a top view of a modified form of Figure 32.

The modified form of my device shown in Figure 42 is similar to that previously described, except that the trip blade releasing mechanism is beneath the blade and at each end portion of the guard and in alignment with the guard blade positioned lugs.

Figure 43:
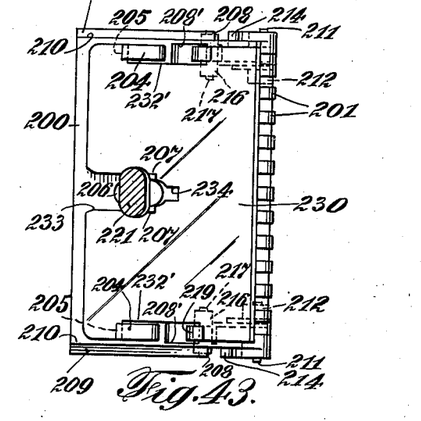
Figure 43 is a top view of a modified form of Figure 32.

The modified form of my device shown in Figure 43 is similar to that shown in Figure 42, except that the trip mechanism is still positioned below a blade but positioned somewhat nearer the ends of the guard.

It will be noted that in the devices of Figures 42 and 43, the trip mechanism is entirely covered by the blade and hence can not possibly be moved by a hand to release them, thus necessitating a special device for this purpose.

The construction and method of use of the blade-magazine as shown in Figures 33 to 41 are similar to those shown in Figures 12 to 23 and described herein, except for such minor changes of construction as are evident, that it is believed a detailed description thereof is not necessary, as similar parts are indicated by similar numerals, it being specially noted that the rear end 116 is extended upwardly to protect the hand of the user from being cut by the withdrawn blade.

My invention, therefore, presents safety razors so constructed that the insertion and removal of blades by hand is practically impossible while the insertion and removal of blades is easily and effectively accomplished by devices adapted for that purpose and especially by blade magazines as shown and described.

Many changes may be made in the unessential elements of the devices, as shown, without going beyond the scope of my invention; the well-known spaced bar guards may be employed instead of toothed guards, the cap may be hinged to the guard, separable therefrom or otherwise attached thereto and other evident changes of parts may be employed. The blade carrying device shown and described in this application is the subject matter of United States patent application for "Blade ejector magazines," filed August 10, 1940, under Serial Number 352,065.

Therefore, I do not limit myself to the particular form, size, number or arrangement of parts of the razors and devices as shown and described as these are given simply as means for clearly describing my invention and may be varied and changed without going beyond the scope of my invention.

I claim:

1. In a safety razor, in combination, a handle, a guard member adapted to receive a blade thereon, a cap member, means adapted to abut said cap member upon a blade positioned between said guard member and said cap member, means adapted to remove said abutment between said cap member and said blade, means carried by said guard member adapted to removably attach said blade upon said guard member during the non-abutting position of said cap member and said blade, means adapted to position said attaching means for the deposit of a blade upon said guard by a longitudinal movement of a blade-carrying device between said guard and a previously deposited blade upon said guard, means carried by said blade-carrying device for positioning a blade upon said guard, means for positioning said attaching means upon said blade upon a reverse movement of said blade-carrying device and means carried by said blade-carrying device adapted to withdraw said previously deposited blade by its said reverse movement.

2. In a safety razor, in combination, a handle, a guard member adapted to receive a blade thereon, a cap member, means adapted to abut said cap member upon a blade positioned between said guard member and said cap member, means adapted to remove said abutment between said cap member and said blade, means carried by said guard member adapted to removably attach said blade upon said guard member during the non-abutting position of said cap member and said blade, means positioned above the blade-receiving face of said guard member and adapted to position said attaching means for the deposit of a blade upon said guard by a longitudinal movement of a blade-carrying device between said guard and a previously deposited blade upon said guard, means carried by said blade-carrying device for positioning a blade upon said guard, means for positioning said attaching means upon said blade upon a reverse movement of said blade-carrying device and means carried by said blade-carrying device adapted to withdraw said previously deposited blade by its said reverse movement.

3. In a safety razor, in combination, a handle, a guard member adapted to receive a blade thereon, a cap member, means adapted to abut said cap member upon a blade positioned between said guard member and said cap member, means adapted to remove said abutment between said cap member and said blade, means carried by said guard member adapted to removably attach said blade upon said guard member during the non-abutting position of said cap member and said blade, trip-operative means adapted to position said attaching means for the deposit of a blade upon said guard by a longitudinal movement of a blade-carrying device between said guard and a previously deposited blade upon said guard, means carried by said blade-carrying device for positioning a blade upon said guard, means for positioning said attaching means upon said blade upon a reverse movement of said blade-carrying device and means carried by said blade-carrying device adapted to withdraw said previously deposited blade by its said reverse movement.

4. In a safety razor, in combination, a handle, a guard member adapted to receive a blade thereon, a cap member, means adapted to abut said cap member upon a blade positioned between said guard member and said cap member, means adapted to remove said abutment between said cap member and said blade, means carried by said guard member adapted to removably attach said blade upon said guard member during the non-abutting position of said cap member and said blade, trip-operative means positioned above the blade-receiving face of said guard member and adapted to position said attaching means for the deposit of a blade upon said guard by a longitudinal movement of a blade-carrying device between said guard and a previously deposited blade upon said guard, means carried by said blade-carrying device for positioning a blade upon said guard, means for positioning said attaching means upon said blade upon a reverse movement of said blade-carrying device and means carried by said blade-carrying device adapted to withdraw said previously deposited blade by its said reverse movement.

5. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; means adapted to position said attaching means for the deposit of a blade upon the upper face of said guard member by a movement of a blade-carrying device in one direction over the face of said guard member, said blade-carrying device having parallel guide members adapted to abut upon said guard guide members during said movement; and means adapted to removably attach said blade attaching means upon said blade upon a reverse movement of said blade-carrying device.

6. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; means positioned above the blade-receiving face of said guard member adapted to position said attaching means for the deposit of a blade upon the upper face of said guard member by a movement of a blade-carrying device in one direction over the face of said guard member, said blade-carrying device having parallel guide members adapted to abut upon said guard guide members during said movement; and means adapted to removably attach said blade attaching means upon said blade upon a reverse movement of said blade-carrying device.

7. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; trip-operative means adapted to position said attaching means for the deposit of a blade upon the upper face of said guard member by a movement of a blade-carrying device in one direction over the face of said guard member, said blade-carrying device having parallel guide members adapted to abut upon said guard guide members during said movement; and means adapted to removably attach said blade attaching means upon said blade upon a reverse movement of said blade-carrying device.

8. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; trip-operative means positioned above the blade-receiving face of said guard member adapted to position said attaching means for the deposit of a blade upon the upper face of said guard member by a movement of a blade-carrying device in one direction over the face of said guard member, said blade-carrying device having parallel guide members adapted to abut upon said guard guide members during said movement; and means adapted to removably attach said blade attaching means upon said blade upon a reverse movement of said blade-carrying device.

9. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; means adapted to position said attaching means for the deposit of a blade upon the upper face of said guard member by a movement of a blade-carrying device in one direction between the face of said guard member and a previously deposited blade thereon, said blade-carrying device having parallel guide members adapted to abut upon said guard guide members during said movement; and means adapted to removably attach said blade attaching means upon said blade upon a reverse movement of said blade-carrying device.

10. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; means positioned above the blade receiving face of said guard member adapted to position said attaching means for the deposit of a blade upon the upper face of said guard member by a movement of a blade-carrying device in one direction between the face of said guard member and a previously deposited blade thereon, said blade-carrying device having parallel guide members adapted to abut upon said guard guide members during said movement; and means adapted to removably attach said blade attaching means upon said blade upon a reverse movement of said blade-carrying device.

11. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; trip-operative means adapted to position said attaching means for the deposit of a blade upon the upper face of said guard member by a movement of a blade-carrying device in one direction between the face of said guard member and a previously deposited blade thereon, said blade-carrying device having parallel guide members adapted to abut upon said guard guide members during said movement; and means adapted to removably attach said blade attaching means upon said blade upon a reverse movement of said blade-carrying device.

12. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; trip-operative means positioned above the blade-receiving face of the guard member adapted to position said attaching means for the deposit of a blade upon the upper face of said guard member by a movement of a blade-carrying device in one direction between the face of said guard member and a previously deposited blade thereon, said blade-carrying device having parallel guide members adapted to abut upon said guard guide members during said movement; and means adapted to removably attach said blade attaching means upon said blade upon a reverse movement of said blade-carrying device.

13. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means carried by said guard member positioned parallel with respect to opposite edges of said guard member and extending angularly with respect to the upper face of said guard member; means adapted to position said attaching means for the deposit of a blade upon the upper face of said guard member by a movement of a blade-carrying device in one direction between the face of said guard member and a previously deposited blade thereon; and means carried by said blade-carrying device adapted to remove said blade by a reverse movement of said blade-carrying device.

14. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide means positioned above the blade-receiving face of said guard member carried by said guard member positioned parallel with respect to opposite edges of said guard member and extending angularly with respect to the upper face of said guard member; means adapted to position said attaching means for the deposit of a blade upon the upper face of said guard member by a movement of a blade-carrying device in one direction between the face of said guard member and a previously deposited blade thereon; and means carried by said blade-carrying device adapted to remove said blade by a reverse movement of said blade-carrying device.

15. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide trip-operative means carried by said guard member positioned parallel with respect to opposite edges of said guard member and extending angularly with respect to the upper face of said guard member; means adapted to position said attaching means for the deposit of a blade upon the upper face of said guard member by a movement of a blade-carrying device in one direction between the face of said guard member and a previously deposited blade thereon; and means carried by said blade-carrying device adapted to remove said blade by a reverse movement of said blade-carrying device.

16. In a safety razor, in combination, a handle; a guard member adapted to receive a blade thereon; a cap member; means adapted to abut said cap upon a blade positioned upon said guard member and between said guard member and said cap member; means adapted to remove said abutment between said cap member and said blade; means carried by said guard member adapted to removably attach said blade upon said guard member during the non-abutting position of said cap member and said blade; guide trip-operative means positioned above the blade-receiving face of the guard member carried by said guard member positioned parallel with respect to opposite edges of said guard member and extending angularly with respect to the upper face of said guard member; means adapted to position said attaching means for the deposit of a blade upon the upper face of said guard member by a movement of a blade-carrying device in one direction between the face of said guard member and a previously deposited blade thereon; and means carried by said blade-carrying device adapted to remove said blade by a reverse movement of said blade-carrying device.

SIDNEY H. BENJAMIN.